United States Patent
Kolesnik et al.

(10) Patent No.: US 9,742,726 B2
(45) Date of Patent: Aug. 22, 2017

(54) DISTRIBUTED DYNAMIC HOST CONFIGURATION PROTOCOL

(71) Applicant: Red Hat Israel, Ltd., Raanana (IL)

(72) Inventors: Michael Kolesnik, Ramat Gan (IL); Assaf Muller, Boston, MA (US)

(73) Assignee: Red Hat Israel, Ltd., Raanana (IL)

( * ) Notice: Subject to any disclaimer, the term of this patent is extended or adjusted under 35 U.S.C. 154(b) by 217 days.

(21) Appl. No.: 14/632,452

(22) Filed: Feb. 26, 2015

(65) Prior Publication Data

US 2016/0255045 A1 Sep. 1, 2016

(51) Int. Cl.
*H04L 29/12* (2006.01)
*H04L 12/46* (2006.01)
*G06F 9/455* (2006.01)

(52) U.S. Cl.
CPC ...... *H04L 61/2015* (2013.01); *G06F 9/45558* (2013.01); *H04L 12/4641* (2013.01); *G06F 2009/45595* (2013.01)

(58) Field of Classification Search
CPC ......... G06F 200/45595; G06F 9/45558; H04L 12/4641; H04L 61/2015
USPC ................................ 709/201–203, 217–223
See application file for complete search history.

(56) References Cited

U.S. PATENT DOCUMENTS

| | | |
|---|---|---|
| 7,639,681 B2 | 12/2009 | Kelly et al. |
| 8,832,007 B2 | 9/2014 | Nahum et al. |
| 2002/0075844 A1 | 6/2002 | Hagen |
| 2005/0152395 A1 | 7/2005 | Hales |
| 2006/0206934 A1* | 9/2006 | Ammirata ........... H04L 61/2015 726/15 |
| 2012/0102186 A1* | 4/2012 | Rewaskar .......... H04L 41/0816 709/224 |
| 2012/0233668 A1* | 9/2012 | Leafe .................... G06F 9/5022 726/4 |
| 2013/0247034 A1* | 9/2013 | Messerli ............. G06F 9/45533 718/1 |
| 2013/0304903 A1* | 11/2013 | Mick .................. H04L 43/0817 709/224 |

(Continued)

FOREIGN PATENT DOCUMENTS

| | | |
|---|---|---|
| CN | 100473037 C | 3/2009 |
| CN | 103491203 A | 1/2014 |

OTHER PUBLICATIONS http://www.arubanetworks.com/techdocs/InstantMobile/Advanced/Content/Chapter18%20DHCPConfiguration/ConfiguringDistributedDHCP.htm, printed Dec. 30, 2014.

(Continued)

*Primary Examiner* — Alina N Boutah
(74) *Attorney, Agent, or Firm* — Lowenstein Sandler LLP (57) ABSTRACT

Systems and methods for managing networking activities of a multi-tenant cloud computing environment. An example method may include distributing, by a controller node executed by a processing device, a dynamic host configuration protocol (DHCP) agent to each of a plurality of compute nodes of a computing environment; identifying, by the controller node, a first virtual machine hosted on a first compute node of the plurality of compute nodes; determining a first DHCP agent associated with the first virtual machine and the first compute node; and transmitting, by the controller node, networking information relating to the first virtual machine to the first DHCP agent hosted by the first compute node.

20 Claims, 5 Drawing Sheets

(56) References Cited

U.S. PATENT DOCUMENTS

| | | | | |
|---|---|---|---|---|
| 2014/0059226 A1* | 2/2014 | Messerli | ............... | G06F 9/546 709/226 |
| 2014/0189031 A1* | 7/2014 | Lee | ............... | H04L 29/08243 709/212 |
| 2014/0351623 A1* | 11/2014 | Baird | ............... | G06F 11/20 714/4.11 |
| 2015/0058968 A1* | 2/2015 | Wang | ............... | H04L 63/0281 726/12 |
| 2015/0103661 A1* | 4/2015 | Shen | ............... | H04L 41/042 370/235 |
| 2015/0178110 A1* | 6/2015 | Li | ............... | G06F 9/45558 718/1 |
| 2015/0180824 A1* | 6/2015 | Atanasov | ............... | H04L 61/2015 709/224 |
| 2015/0188788 A1* | 7/2015 | Kolesnik | ............... | H04L 63/0272 709/224 |
| 2015/0244608 A1* | 8/2015 | Muller | ............... | H04L 45/02 709/220 |
| 2015/0281274 A1* | 10/2015 | Masurekar | ............... | H04L 63/1466 726/22 |
| 2016/0013974 A1* | 1/2016 | Reddy | ............... | H04L 67/38 709/222 |
| 2016/0072727 A1* | 3/2016 | Leafe | ............... | G06F 8/60 709/226 |
| 2016/0087847 A1* | 3/2016 | Krithivas | ............... | H04L 41/12 709/224 |
| 2016/0127509 A1* | 5/2016 | Uriel | ............... | H04L 61/103 709/203 |

OTHER PUBLICATIONS http://serverfault.com/questions/368512/can-i-have-multiple-dhcp-servers-on-one-network, printed Dec. 30, 2014.
http://specs.openstack.org/openstack/neutron-specs/specs/kilo/dhcpservice-loadbalancing.html, printed Dec. 30, 2014.
http://blogs.technet.com/b/teamdhcp/archive/2012/06/28/ensuring-high-availability-of-dhcp-using-windows-server-2012-dhcp-failover.aspx, printed Dec. 30, 2014.

* cited by examiner

DISTRIBUTED DYNAMIC HOST CONFIGURATION PROTOCOL

TECHNICAL FIELD

The present disclosure is generally related to virtualized computer systems, and is more specifically related to systems and methods for distributing dynamic host configuration protocol functionality.

BACKGROUND

Dynamic Host Configuration Protocol (DHCP) is a standardized network protocol used on Internet Protocol (IP) networks for dynamically distributing network configuration parameters, such as network addresses (e.g., IP addresses) for interfaces and services. The protocol operates based on the client-server model, wherein a computer or other networked device connecting to a network employs DHCP client software (i.e., a DHCP agent) in the operating system to send a broadcast query requesting necessary information. On large networks that consist of multiple links, a single DHCP server may service the entire network when aided by DHCP relay agents located on the interconnecting routers. Such agents relay messages between DHCP clients and DHCP servers located on different subnets. However, the single DHCP server is a single point of failure for the multiple DHCP clients in the network.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems including a networking management system controller node in communication with DHCP agents distributed across multiple compute nodes executing multiple virtual machines (VMs) within a multi-tenancy cloud virtual networking environment.

Certain conventional implementations include a network node to manage the network services required by the network such as routing services, IP address distribution to the virtual machines on the network via DHCP services, etc. The network node provides the network services to the multiple compute nodes in the cloud environment. A single DHCP agent runs on the network node and spawns DHCP servers to issue IP addresses for the multiple virtual machines within one or more virtual networks of a tenant (also referred to as a tenant networks or subnetworks). In certain conventional implementations, the DHCP agent is hosted on a single machine (i.e., the network node), creating a single point of failure. However, if the network node fails, new virtual machines are unable to receive an IP address for communicating on the network. In addition, existing virtual machines may lose their IP address and connectivity because those virtual machines may need to renew a list of DHCP by connecting to the DHCP agent, which is unavailable if there is an outage of the network node.

In other conventional implementations, a "high availability" framework may be employed wherein a compute node sends a request for DHCP services to multiple DHCP servers and the compute node selects the first DHCP server that responds to the request to provide the DHCP services. In this arrangement, multiple network nodes are employed, wherein each network node executes a DHCP agent configured to service multiple tenant networks in the cloud environment. Accordingly, IP definitions associated with a particular tenant network are maintained and executed by multiple DHCP servers executing on the multiple network nodes. In this implementation, each DHCP server consumes an IP address on the tenant subnetwork. Therefore, the more DHCP servers that are employed, the more IP addresses that are consumed. In addition, there is an inefficient use of resources (e.g., memory, disk space, CPU processing, etc.) since each DHCP server maintains the IP definitions for all of the virtual machines in each of the multiple tenant subnetworks that the DHCP servers support, even though each individual DHCP server serves only a percentage of the virtual machines.

Aspects of the present disclosure address the above noted and other deficiencies by providing methods and systems including a networking management system controller node (herein referred to as a "controller node") configured to provision a DHCP agent to each of the multiple compute nodes of the multi-tenancy cloud computing environment. In accordance with one or more aspects of the present disclosure, the DHCP agent services the one or more virtual machines executing on the associated compute node. In an implementation, DHCP-related traffic for the virtual machines of a tenant network remains local (e.g., via a local virtual private network of the host compute node) to a particular compute node since the distributed DHCP agent is associated with the particular compute node.

According to aspects of the present disclosure, in view of the association between the distributed DHCP agent and the corresponding compute node, the controller node is configured to communicate networking information relating to a particular virtual machine of the compute node to only the particular compute node executing the virtual machine. The networking information may include any information related to the network virtualization and network connectivity relating to one or more virtual machines. Exemplary networking information may include, but is not limited to, networking notifications, response to networking queries received from the one or more compute nodes, DHCP agent scheduling information, load balancing information, level three (L3) routing information, remote procedure call (RPC) communications, an Address Resolution Protocol (ARP) message, DHCP-related information, IP address information, etc.

Various aspects of the above referenced methods and systems are described in details herein below by way of examples, rather than by way of limitation.

Figure 1:
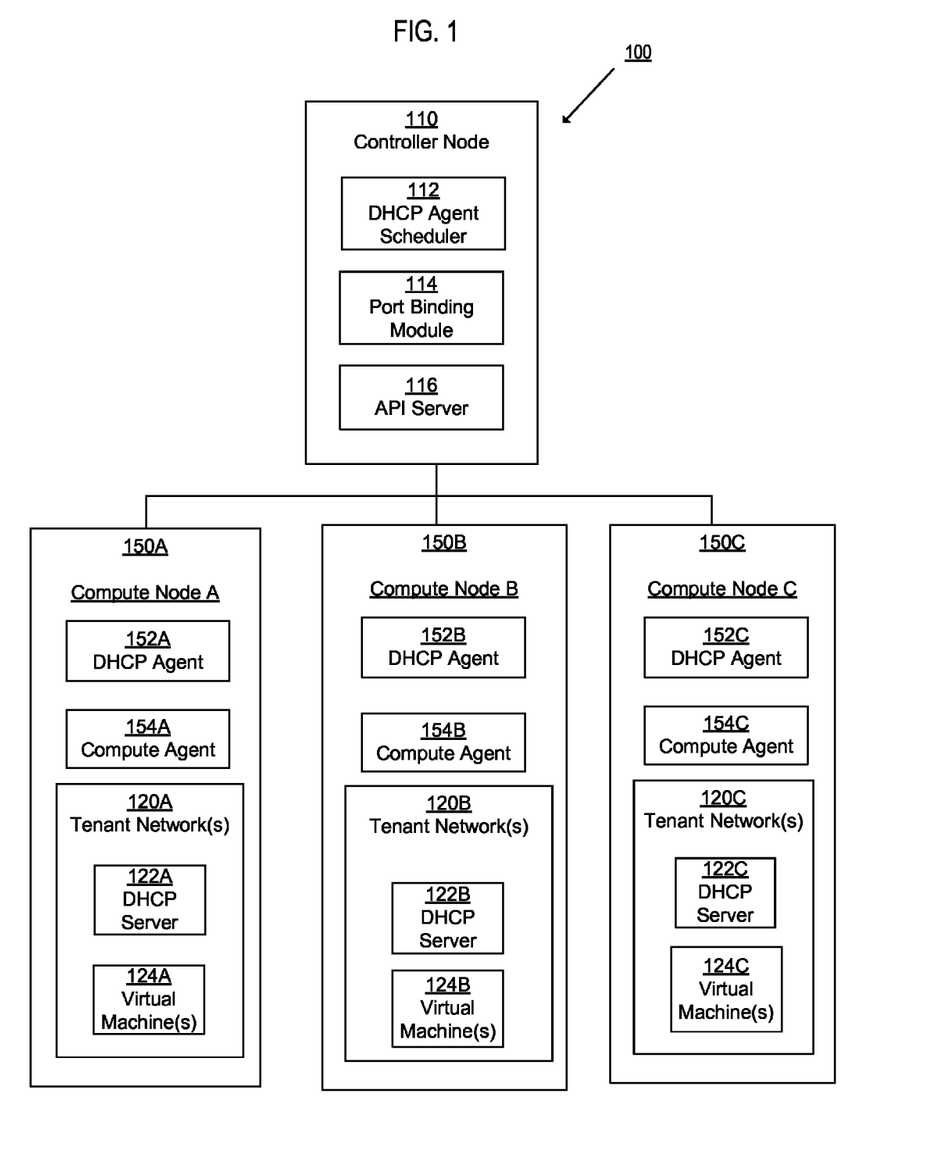
FIG. 1 depicts a high-level component diagram of an example computer system operating in accordance with one or more aspects of the present disclosure.

FIG. 1 depicts a high-level component diagram of an illustrative example of a networking management computer system 100 operating in accordance with one or more aspects of the present disclosure. The networking management computer system 100 may comprise a networking controller node (herein the "controller node") 110 operatively coupled to multiple compute nodes (e.g., compute node A, compute node B, and compute node C) 150A-C of a multi-tenancy cloud computing environment. Each of the compute nodes 150A-C is configured to execute one or more virtual machines 124A-C operating in a corresponding tenant network 120A-C. In an implementation, the compute node may be the Nova compute node employed in an OpenStack Networking environment.

The multiple compute nodes 150A-C include hardware configured to providing processing, memory, storage, and networking resources to execute virtual machine instances on behalf of one or more tenants. In an implementation, the compute nodes 150A-C may each comprise a memory and one or more processing devices configured to execute a compute agent 154A-C. The compute node 150A-C may execute multiple virtual machines 124A-C, by executing a software layer, often referred to as a "virtual machine monitor" or "hypervisor," above the hardware and below the virtual machines. The hypervisor may abstract the physical layer, including processors, memory, and I/O devices, and present this abstraction to virtual machines 124A-C as virtual devices. A virtual machine 124A-C may execute a guest operating system, which may utilize underlying virtual processors, virtual memory, and virtual I/O devices. Under the guest operating system, one or more applications may be running on the virtual machine 124A-C.

The compute agent 154A-C of each respective compute node 150A-C is configured to operate the hypervisor managing the one or more VMs 124A-C executing on the corresponding compute node 150A-C. In an implementation, the compute agent 154A-C is a software module configured to receive requests for new virtual machines and provide instructions to the hypervisor to create the virtual machines and associated virtual network devices for the new virtual machines.

Multiple tenant networks (also referred to as subnetworks) may be executed on a compute node 150A-C. For example, a computer system (e.g., compute system 100 in FIG. 1) may include multiple compute nodes 150A-C operating multiple virtual machines in a virtual network of a first tenant (e.g., Tenant 1) and second tenant (e.g., Tenant 2). Each compute node 150A-C may operate virtual machines associated with a single tenant or multiple tenants. A tenant network may be associated with a customer, a company, a particular division or department within a company, an organization, etc.).

In an implementation, the compute node 150A-C may include a layer two (L2) agent (not shown), such as a VLAN networking agent, configured to manage and establish the virtual network connections on behalf of the associated compute node in response to a network connection request from the DHCP agent to the controller node.

According to an aspect of the present disclosure, a compute node (e.g., compute node B of FIG. 1) may include virtual machines of the first tenant connected to a first virtual networking switch of the compute node and the virtual machines of the second tenant connected to a second virtual networking switch of the compute node. In an implementation, the two virtual switches are not connected to one another to establish isolation between the first tenant and second tenant. In this regard, the virtual machines of the first tenant cannot communicate with virtual machines of the second tenant via local routing.

In an example, a first tenant network may include virtual machines associated with a first department (e.g., the accounting department) of a company (e.g., Company A) and a second tenant network may include virtual machines associated with a second department (e.g., the human resources department) of the same company (e.g., Company A), wherein the two tenant networks are isolated from one another. In this regard, a company may establish a tenant subnetwork for individual divisions, departments, or organizations within the company, wherein multiple divisions are isolated from one another on individual tenant subnetworks.

Virtual machines of each respective tenant network 120A-C are associated with different DHCP servers spawned by the DHCP agent. In an implementation, the DHCP agent assigns each tenant network its own DHCP server.

In an implementation, the controller node 110 provisions a DHCP agent 152A-C to each of the compute nodes 150A-C. As shown in the exemplary arrangement in FIG. 1, DHCP agent 152A is distributed to compute node A 150A, DHCP agent 152B is distributed to compute node B 150B, and DHCP agent 152C is distributed to compute node C 150C. The DHCP agent 152A-C is a software module configured to spawn (and terminate or kill) DHCP servers (e.g., DHCP Servers 122A-C in FIG. 1) for the servicing of DHCP requests for the virtual machines executing on the corresponding compute node A-C. In an implementation, the DHCP agent 152A-C is configured to relay DHCP messages between its corresponding compute node 150A-C and the spawned DHCP servers 122A-C. In an implementation, DHCP-related traffic for the virtual machines of a tenant network remains local to the compute node because the DHCP agent is distributed to and locally hosted by the compute node running the virtual machines.

According to aspects of the present disclosure, each tenant network is associated with its own virtual switch on each compute node and all of the virtual machines and services for that tenant network are connected to that same virtual switch. Accordingly, the virtual machines and the DHCP server of the compute node are connected locally on the same network. In an implementation, the controller node 110 is configured to set up the network connectivity for a virtual machine by connecting the corresponding virtual network device of the virtual machine to the network.

In an implementation, the controller node 110 is configured to enable network virtualization and network connectivity as a service between virtual network interface devices (e.g., vNICs) managed by cloud computing services and the multiple virtual machines 124A-C in the multi-tenancy cloud networking environment. The controller node 110 is configured to provision the virtual networks for the multiple tenants (e.g., a customer, a company, a division within a company, an organization, etc.) of the cloud network. In an example, the controller node may be a Neutron controller employed in OpenStack Networking for managing networks and IP addresses in the cloud networking environment. In implementations, the controller node may be any suitable network controller, such as, for example, a software-defined network (SDN) controller having a DHCP application to manage distributed DHCP servers on multiple compute nodes. In an example, the controller node may be an oVirt management component having DHCP management functionality.

In various illustrative examples, the controller node 110 may include a DHCP Agent Scheduler 112 configured to manage the multiple DHCP agents 152A-C distributed to the multiple compute nodes 150A-C. The DHCP Agent scheduler is a software module configured to identify the associations between the distributed DHCP agents and their respective compute nodes (e.g., which DHCP agent is associated with which compute node) and selects the appropriate DHCP agent for communicating networking information to the ports associated with the virtual machines running on the associated compute node.

In addition, the controller node 110 may include a Port Binding module 114 configured to bind or associate a port of a virtual machine with the compute node running the virtual machine. In an implementation, the port binding information is used by the DHCP agent scheduler to check that the ports bound to a particular compute node are serviced by a DHCP agent local to that compute node. In addition, the controller node 110 may include an Application Program Interface (API) server 116 configured to manage and maintain APIs and extensions to perform services in the cloud computing environment, such as, for example, APIs relating to launching server instances, creating images, assigning metadata to instances and images, creating containers and objects, etc.

In an implementation, in the API server 116, a caller may perform various functions, such as, for example, creating a virtual port on the tenant network; sending a request to bind a virtual port to a hypervisor, thereby triggering the binding of the port by the Port Binding module 114 and updating of the DHCP agent running on that hypervisor about the new IP address(es) that it needs to service; updating the virtual port status to "active" thereby triggering the binding of the port by the Port Binding module 114 and updating of the DHCP agent running on that hypervisor about the new IP(s) that it needs to service; updating the IP address(es) on a virtual port, thereby triggering an update of the DHCP agent running on the hypervisor (that the port is bound to) about the new IP address(es) that it needs to service and the old ones that were removed; removing the virtual port, thereby triggering an update of the DHCP agent running on the hypervisor (that the port is bound to) to stop servicing the IPs of the port; updating the virtual port status to "inactive," thereby triggering an update of the DHCP agent running on the hypervisor (that the port is bound to) to stop servicing the IPs of the port.

According to aspects of the present disclosure, if a DHCP server fails, the corresponding DHCP agent of the compute node can locally restart the failed DHCP server, and only those virtual machines on the corresponding compute node are impacted. In addition, the scope of failure may be further limited in the event that a local DHCP agent of a compute node fails, wherein only the virtual machines of that compute node are affected since the corresponding DHCP agent (and spawned DHCP servers) serves only those local virtual machines running on the common compute node.

Figure 2:
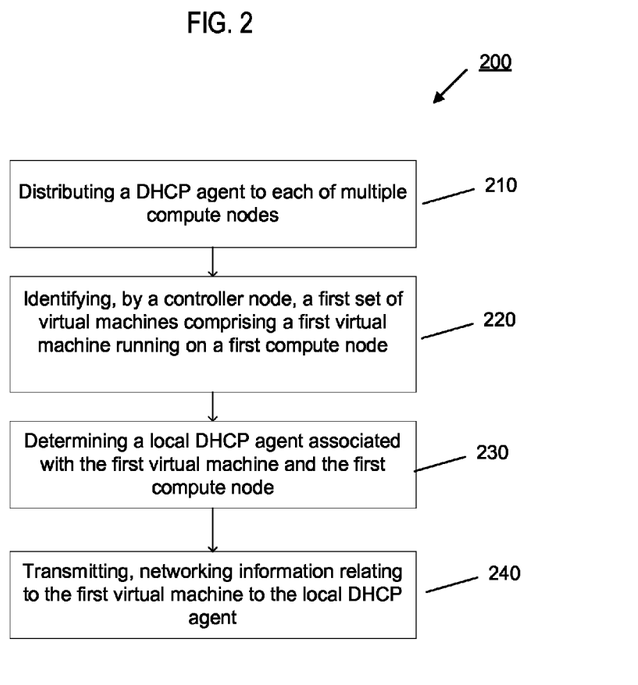
FIG. 2 depicts a flow diagram of a method of communicating information in a system including distributed DHCP agents, in accordance with one or more aspects of the present disclosure.

FIG. 2 depicts a flow diagram of one illustrative example of a method 200 for managing networking activities associated with a multi-tenant cloud computing environment, in accordance with one or more aspects of the present disclosure. Method 200 and/or each of its individual functions, routines, subroutines, or operations may be performed by one or more processing devices of the computer system (e.g., a controller node 110 of FIG. 1) implementing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processing threads implementing method 200 may be executed asynchronously with respect to each other.

At block 210, a processing device of a computer system running the controller node (e.g., the Neutron controller in an OpenStack networking environment) may manage an DHCP agent distributed to each of the multiple compute nodes of the cloud computing environment. According to implementations of the present disclosure, the controller node is configured to determine which of the plurality of DHCP agents serves which of the running virtual machines. In an implementation, the DHCP agent may be pre-installed on each compute node and made available as a server. In an implementation, the controller node may be configured to install and run the respective DHCP agents on the compute nodes.

The compute nodes may host one or more virtual machines of one or tenant networks. In an implementation, the controller node may maintain a record identifying an association between the distributed DHCP agent and its host compute node.

At block 220, the processing device of the controller node may identify one or more virtual machines (e.g., a set of virtual machines) running on each of the multiple compute nodes. For example, the controller node may identify that a first virtual machine is running on compute node A, a second virtual machine is running on compute node B, etc. In an implementation, the controller node may identify the one or more tenant networks and its associated virtual machines that are running on each of the respective compute nodes in the cloud computing environment. In this implementation, the controller node may map or associate each virtual machine to a distributed DHCP agent operating locally on the same compute node.

In an implementation, the controller node may identify an association between a particular virtual machine (e.g., a first virtual machine) and the local DHCP agent running on the common compute node in response to a query or request received from the DHCP agent. In an example, the DHCP agent may send a request for networking information (e.g., a DHCP request for the assignment of a network address (e.g., an IP address), an RPC communication, a neighbor solicitation request, etc.).

According to aspects of the present disclosure, the local DHCP agent of a particular compute node (e.g., compute node A) is configured to handle DHCP-related requests and traffic for the virtual machines running on the same compute node (e.g., compute node A). In this regard, a local DHCP agent may service virtual machines belonging to multiple different tenants, provided that the virtual machines are all running on the same compute node as the local DHCP agent.

At block 230, the processing device executing the controller node may determine a local DHCP agent associated with a particular or target virtual machine running on a particular compute node. In operation, the controller node may have networking information to communicate to a target virtual machine (e.g., a first virtual machine). To efficiently communicate the networking information, the controller node determines which local DHCP agent is hosted by the same compute node as the first virtual machine. In an implementation, the controller node may use the port binding information associated with the target virtual machine to determine its compute node and associated local DHCP agent.

At block 240, the processing device executing the controller node may transmit networking information relating to the target virtual machine to the local DHCP agent.

Figure 3:
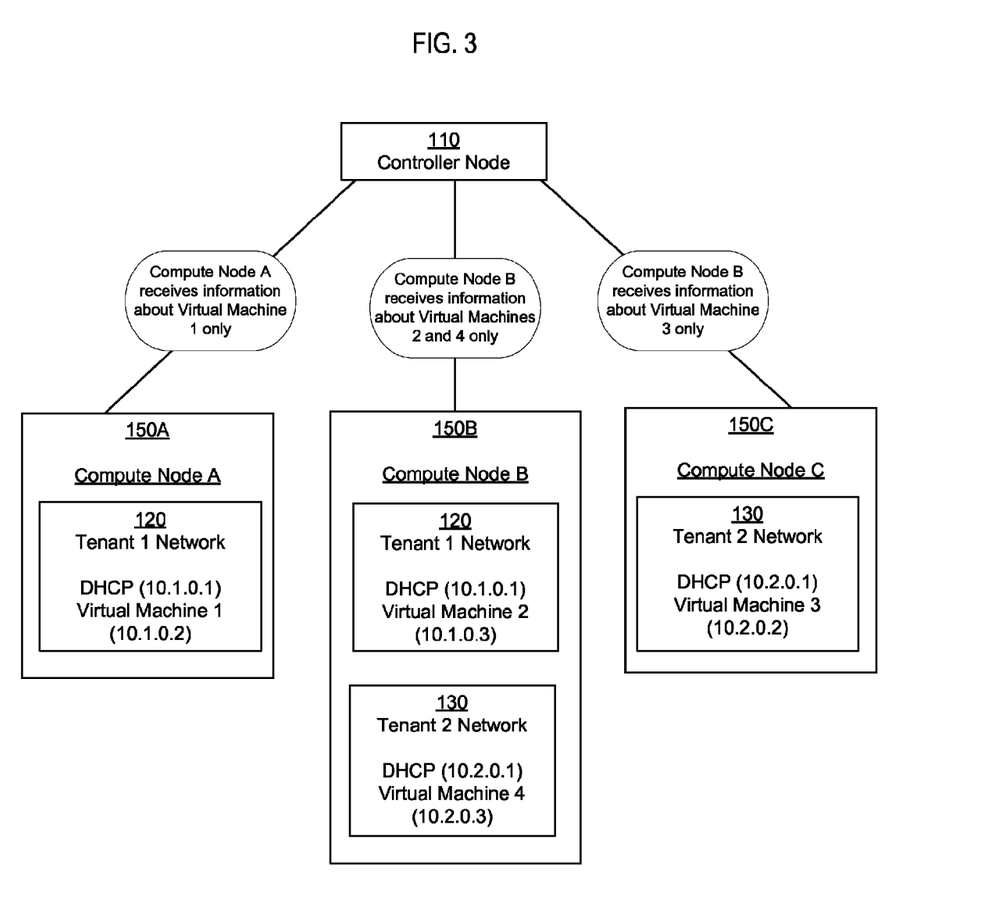
FIG. 3 depicts an example computer system operating in accordance with one or more aspects of the present disclosure.

FIG. 3 illustrates an example system implementing the method described above in connection with FIG. 2. In FIG. 3, an exemplary cloud computing environment is shown. The cloud computing environment includes a controller node 110 (e.g., a Neutron controller) communicatively connected to three compute nodes (e.g., Compute Node A 150A, Compute Node B 150B, and Compute Node C 150C). As shown, Compute Node A 150A hosts a virtual machine (Virtual Machine 1) belonging to a first tenant network (Tenant 1 Network).

As shown, Compute Node B 150B hosts two virtual machines (Virtual Machine 2 and Virtual Machine 4). In this example, Virtual Machine 2 is a part of the Tenant 1 Network and Virtual Machine 2 is a part of the Tenant 2 Network. In addition, Compute Node C 150C hosts Virtual Machine 3 belonging to the Tenant 2 Network. As described above, each of the compute nodes hosts a particular DHCP agent configured to service the one or more virtual machines running on the host compute node. In the illustrated example, a first DHCP agent hosted by Compute Node A 150A services Virtual Machine 1, a second DHCP agent hosted by Compute Node B 150B services Virtual Machines 2 and 4, and a third DHCP agent hosted by Compute Node C 150C services Virtual Machine 3.

In operation, Compute Node A 150A receives networking information related to Virtual Machine 1 only (i.e., Compute Node A 150A does not receive networking information relating to Virtual Machines 2, 3, or 4). In this example, Compute Node B 150B receives networking information related to Virtual Machines 2 and 4 only. In addition, Compute Node C 150C receives networking information related to Virtual Machine 3 only.

In this example, in an implementation, since Compute Node A 150A is only running Virtual Machine 1, Virtual Machine 1's port is bound to Compute Node A. Accordingly, updates regarding Virtual Machine 1's port may be transmitted to Compute Node A only. In an implementation, when the DHCP agent on Compute Node A 150A sends a query to the Controller Node 110, in response, the DHCP agent receives only information related to Virtual Machine 1's port.

As illustrated the DHCP server for each subnetwork (e.g., Tenant 1 Network and Tenant 2 Network) has the same IP address. In this example, the DHCP server servicing the virtual machines of the Tenant 2 Network (e.g., Virtual Machine 1 running on Compute Node A 150A and Virtual Machine 2 running on Compute Node B 150B) has an IP address of 10.1.0.1. In addition, the DHCP server serving Tenant 2 Network virtual machines (e.g., Virtual Machines 3 and 4) have an IP address of 10.2.0.1. In an implementation, this results in efficient IP consumption. In an alternative implementation, the DHCP agent may consume an IP address for each compute node that the DHCP agent services.

In implementations of the present disclosure, a single IP address may be assign per each DHCP server. For example, as shown in FIG. 3, the DHCP server servicing the Tenant 1 Network is assigned an IP address of 10.1.0.1. In this example, the DHCP server servicing the Tenant 2 Network is assigned an IP address of 10.2.0.1. In an implementation, the DHCP port on each tenant's network has the same IP address on all of the hosts servicing that tenant network. Advantageously, according to implementations of the present disclosure, only a single IP address is consumed for each tenant network, resulting in an efficient management of IP address consumption.

With reference to the example shown in FIG. 3, Compute node B may maintain two virtual switches connecting internally the virtual machines of the respective tenant networks (e.g., one virtual switch for the Tenant 1 Network and one virtual switch for the Tenant 2 Network) and connecting together on isolated networks (e.g., Tenant 1 Network may be on VLAN 100 and Tenant 2 Network may be on VLAN 200). Internally, the virtual machines on the same compute node may connect to one another without going through the isolation (e.g., by adding a tag or header to a packet and sending the packet outside of the local virtual private network).

Figure 4:
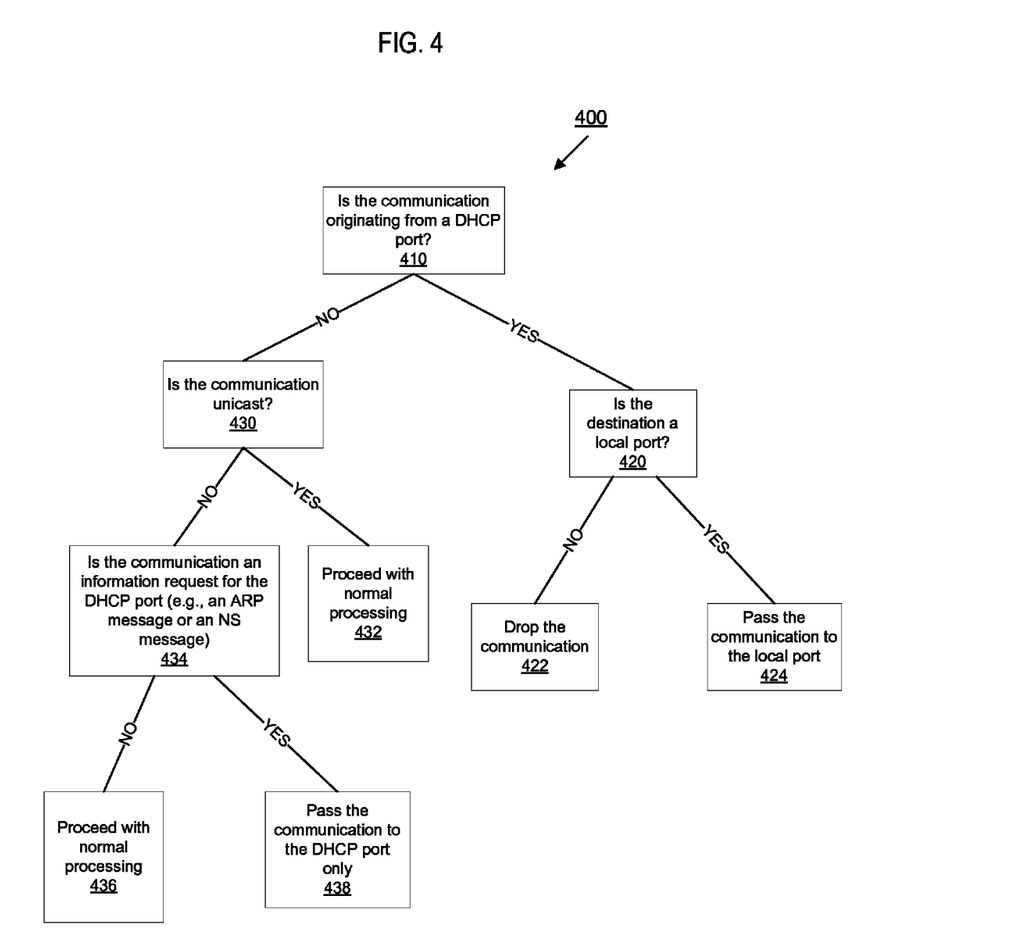
FIG. 4 depicts a flow diagram of a method of managing networking communications by a compute node, in accordance with one or more aspects of the present disclosure.

FIG. 4 depicts a flow diagram of one illustrative example of a method 400 for management of networking communications by a compute node, in accordance with one or more aspects of the present disclosure. In implementation, an integration bridge (also referred to as "br-int") of the compute node may be configured to perform the operations of method 400.

In block 410, upon receipt of a communication including one or more packets, the compute node determines if the communication originated from a DHCP port. If the communication originates from a DHCP port, the compute node determines if the destination is a local port, in block 420. If the destination is a local port, then the communication is passed to the local port, in block 424. If not, then the communication is dropped, in block 422.

In an implementation, if the communication does not originate from a DHCP port, the compute node determines if the communication is unicast (e.g., the sending of a message to a single network destination identified by a unique address), in block 430. If it is determined that the traffic is unicast, then the compute node proceeds with normal processing, in block 432. In an implementation, normal processing may include learning switch behavior, such as determining if the destination MAC address is known to the switch (exists on a table that is associated with a port in the switch). If the destination MAC address is known, the traffic is sent to the port the MAC address is on. If not, the compute node may flood the traffic to all ports. In an implementation, if the packet is VLAN tagged, then the packet is sent to only the ports that accept this tag and only the tables for this tag are queried.

If the communication is not unicast (e.g., it is a broadcast communication), then it is determined whether the communication is an information request for the DHCP port (e.g., an Address Resolution Protocol (ARP) message or a Neighbor Solicitation (NS) message), in block 434.

If in block 434 it is determined that the information request is not for the DHCP port, then the compute node proceeds with normal processing, in block 436. Otherwise, if the information request is for the DHCP port, then the compute node passes the communication to the DHCP port only, in block 438.

Figure 5:
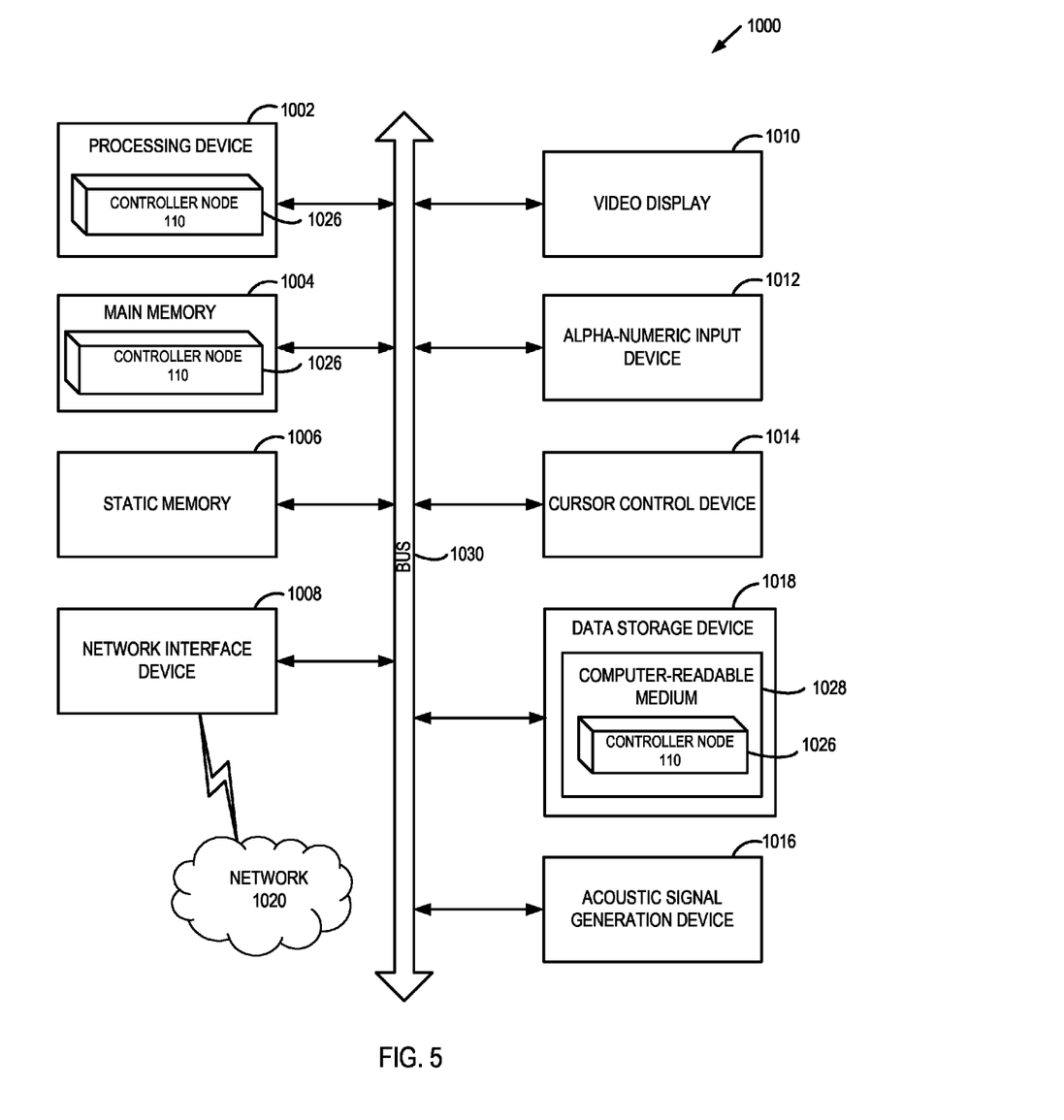
FIG. 5 depicts a block diagram of an example computer system operating in accordance with one or more aspects of the present disclosure.

FIG. 5 schematically illustrates a component diagram of an example computer system 1000 which can perform any one or more of the methods described herein. In various illustrative examples, computer system 1000 may run controller node 110, compute nodes 150A-C, and DHCP Agents 152A-C of FIG. 1.

Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

"Processor" or "processing device" herein refers to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute controller node 110 implementing method 200 for performing networking management services.

"Memory device" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data. In an illustrative example, an I/O device may be provided by a network interface controller (NIC) or a block I/O device, such as a disk.

Example computer system 1000 may further comprise a network interface device 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of controller node 110 implementing method 200 for performing networking management services.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 4 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
    distributing, by a controller node executed by a processing device, a dynamic host configuration protocol (DHCP) agent to each of a plurality of compute nodes of a computing environment;
    identifying, by the controller node, a first virtual machine hosted on a first compute node of the plurality of compute nodes;
    determining a first DHCP agent associated with the first virtual machine and the first compute node; and
    transmitting, by the controller node, networking information relating to the first virtual machine to the first DHCP agent hosted by the first compute node.

2. The method of claim 1, wherein the first virtual machine is associated with a first tenant network.

3. The method of claim 2, wherein first compute node hosts a second virtual machine associated with a second tenant network.

4. The method of claim 3, wherein the first DHCP agent spawns a first DHCP server to service the first virtual machine and the first DHCP agent spawns a second DHCP server to service the second virtual machine.

5. The method of claim 4, wherein a first single IP address is assigned to the first DHCP server and a second single IP address is assigned to the second DHCP server.

6. The method of claim 1, further comprising receiving, by the controller node, a networking request relating to the first virtual machine from the first DHCP agent hosted by the first compute node.

7. The method of claim 1, wherein DHCP-related traffic for a plurality of virtual machines of a first tenant network hosted by the first compute node is transmitted via a local virtual private network of the first compute node.

8. A system comprising:
    a memory; and
    a processing device executing a controller node, operatively coupled to the memory, to:
        distribute a dynamic host configuration protocol (DHCP) agent to each of a plurality of compute nodes of a computing environment;
        identify a first virtual machine hosted on a first compute node of the plurality of compute nodes;
        determine a first DHCP agent associated with the first virtual machine and the first compute node; and
        transmit networking information relating to the first virtual machine to the first DHCP agent hosted by the first compute node.

9. The system of claim 8, wherein the first virtual machine is associated with a first tenant network.

10. The system of claim 9, wherein first compute node hosts a second virtual machine associated with a second tenant network.

11. The system of claim 10, wherein the first DHCP agent spawns a first DHCP server to service the first virtual machine and the first DHCP agent spawns a second DHCP server to service the second virtual machine.

12. The system of claim 11, wherein a first single IP address is assigned to the first DHCP server and a second single IP address is assigned to the second DHCP server.

13. The system of claim 8, the processing device to receive a networking request relating to the first virtual machine from the first DHCP agent hosted by the first compute node.

14. The system of claim 8, wherein DHCP-related traffic for a plurality of virtual machines of a first tenant network hosted by the first compute node is transmitted via a local virtual private network of the first compute node.

15. A non-transitory computer-readable storage medium comprising executable instructions that, when executed by a processing device, cause the processing device to:
    distribute, by a controller node executed by the processing device, a dynamic host configuration protocol (DHCP) agent to each of a plurality of compute nodes of a computing environment;
    identify, by the controller node, a first virtual machine hosted on a first compute node of the plurality of compute nodes;
    determine a first DHCP agent associated with the first virtual machine and the first compute node; and
    transmit, by the controller node, networking information relating to the first virtual machine to the first DHCP agent hosted by the first compute node, wherein the first DHCP agent spawns a first DHCP server to service the first virtual machine, and wherein DHCP-related traffic the first virtual machine is transmitted via a local virtual private network of the first compute node.

16. The non-transitory computer-readable storage medium of claim 15, wherein the first virtual machine is associated with a first tenant network.

17. The non-transitory computer-readable storage medium of claim 16, wherein first compute node hosts a second virtual machine associated with a second tenant network.

18. The non-transitory computer-readable storage medium of claim 17, wherein the first DHCP agent spawns a second DHCP server to service the second virtual machine.

19. The non-transitory computer-readable storage medium of claim 18, wherein a first single IP address is assigned to the first DHCP server and a second single IP address is assigned to the second DHCP server.

20. The non-transitory computer-readable storage medium of claim 15, the processing device to receive, by the controller node, a networking request relating to the first virtual machine from the first DHCP agent hosted by the first compute node.

\* \* \* \* \*